July 29, 1941.  C. ADAMOLI  2,250,851
PROCESS FOR THE EXTRACTION OF BASES OF RARE
ELEMENTS CONTAINED IN ORES AND ROCKS
Filed Nov. 8, 1938
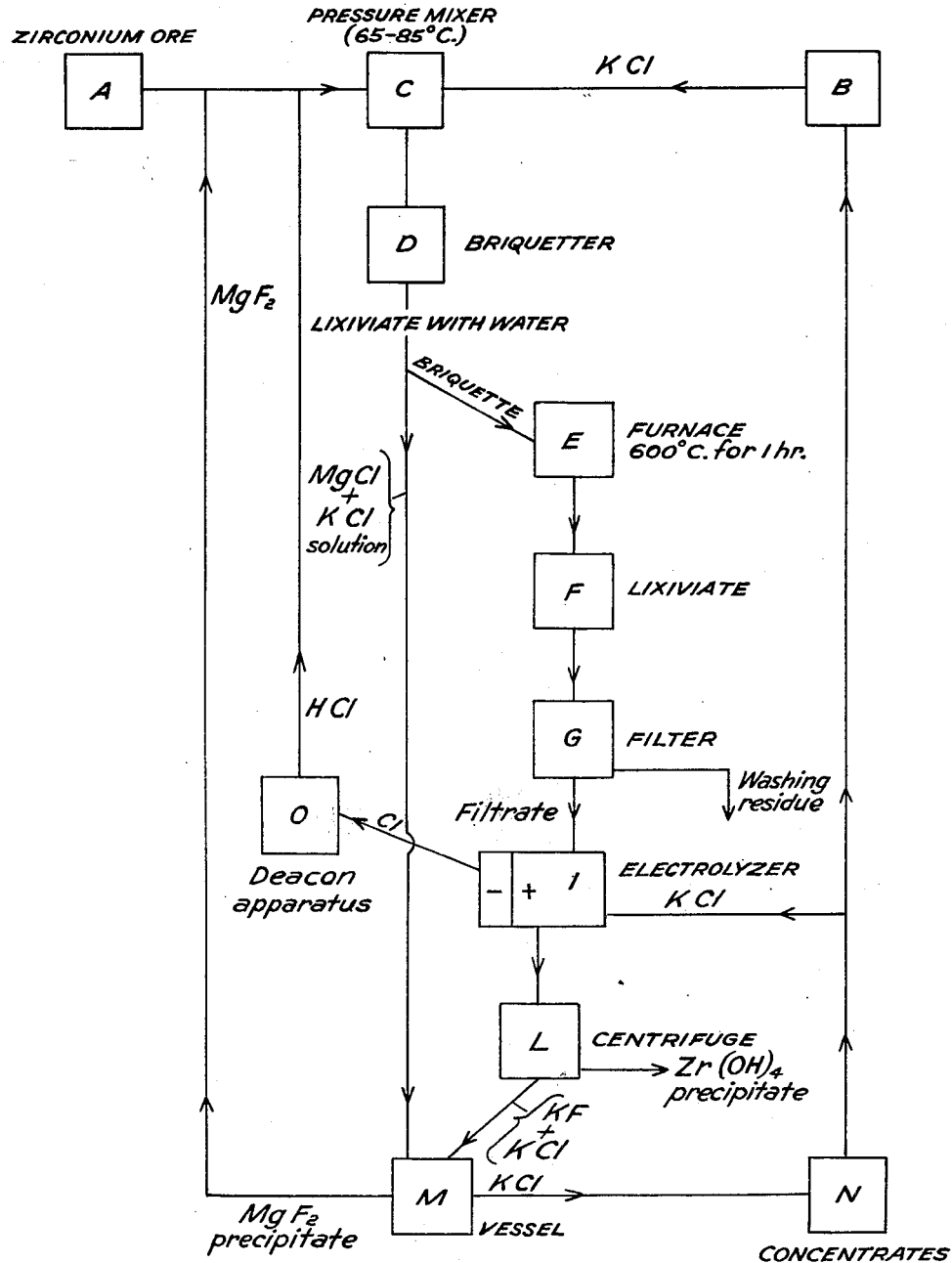
INVENTOR
Carlo Adamoli
by
Stebbins and Blenko.
His Attys.

Patented July 29, 1941

2,250,851

UNITED STATES PATENT OFFICE 2,250,851

PROCESS FOR THE EXTRACTION OF BASES OF RARE ELEMENTS CONTAINED IN ORES AND ROCKS

Carlo Adamoli, Milan, Italy, assignor to Perosa Corporation, Wilmington, Del., a corporation of Delaware Application November 8, 1938, Serial No. 239,595
In Italy November 24, 1937

7 Claims. (Cl. 23—19)

It is highly desirable, in many cases of extraction on a commercial scale of precious chemical products which are found in nature in the form of complex silicates, of silico-aluminates and the like, but in comparatively small contents, in the middle of the original mineral masses, to be able to conduct the extraction so as to attack, by the chemico-physical treatments which are used, only the chemical element or compound which it is desirable to extract without consuming energy or reagents for the silica masses or silica and alumina masses or the like which contain the precious element to be extracted. The advantage of such an extraction is still greater when the extraction is to be effected not from characteristic ores, but from rocks which contain these ores and for which the cost of treatment would increase, the smaller the quantity of element to be extracted which is contained therein. Many chemical elements, the so-called rare elements, are found in conditions which are such that they can be opportunely extracted by the application of the above disclosed technical criteria.

According to the present invention, it has been found that in many cases by combining the action of strong acids such as HCl, $HNO_3$, $H_2SO_4$ or trichloracetic acid, with the action of fluorides which are not easily soluble in water such as $CaF_2$, $MgF_2$, $AlF_3$, $PbF_2$, $LiF$, $CuF_2$, $SrF_2$, it is possible to solubilize chemical elements of this kind which are contained in the treated mineral matter, without the siliceous or silico-aluminous gangue being converted or rendered soluble under the condition that a greater chemical affinity is preserved between them and suitable reagents formed, more particularly, of water soluble salts of the said acids. This novel extraction process can be applied without important modifications to elements of very different chemical groups such as, for instance, to heavy metals such as niobium, tantalum, thorium and zirconium, to earthy metals such as beryllium, germanium and scandium, and to alkali metals such as caesium and lithium. It is evident that by the character of the process itself, which is suitable for the extraction of small quantities of elements which are contained in much larger quantities of starting materials, the economy of the extraction process has a fundamental importance; it is precisely what is performed according to the process which will be presently described by means of a closed cycle of chemical conversions, the said cycle permitting the constant regeneration of the reagents which are used and which, furthermore, regardless of the quantity of mass which is submitted to the treatment, are stoichiometrically proportioned to the sole element to be extracted. For more clearness a typical non-limitative scheme of the cycle of operations will be disclosed and described hereinafter with reference to the appended drawing.

The conveniently pulverized ore, which is contained in the receptacle A is supplied to the pressure mixer C where it meets the salt solution which has been collected at B and which comes from the concentration apparatus N, with the precipitated fluoride coming from the decanter M and with the gaseous acid or the acid in solution coming from the Deacon converter or the like which is mounted at O. It is at C that the first reaction takes place, the duration, thermal conditions and pressure of this reaction varying according to the character of the ore and of the reagents which are used for this purpose, after which the paste is compressed and agglomerated in the form of briquettes D, while the liquid which has been expelled out of the said paste is lead to the precipitation and decantation apparatus M. The briquettes pass then to the furnace E where the reaction is achieved and then they are released, by crushing and lixiviation at F, from the solution of the rare compound to be extracted through the washing press at G, while the residue of the ore is discarded. The solution which contains the rare compound is introduced into the cathodic compartment of the electrolyzer I where this rare compound is separated by precipitation and by means of the centrifuge L it is extracted and collected in suitable vessels. The residual solution coming from the centrifuge is conveyed to M where it meets the liquid which has been expelled by D and the insoluble fluoride which is precipitated is returned into the cycle, while the decanted liquid is conveyed to the concentration apparatus N and from here to B.

On leaving the electrolyzer I the anodic product such as is present or after having been transformed at O is directly returned into the cycle at C.

The drawing has been labeled to illustrate the production of zirconium hydrate from a zirconium ore by the method of Example 1.

Examples of execution of the process will be now described, the said examples being non-limitative as regards the ore as well as the strong acid which is used.

Example 1

100 kgs. of "garnet" conglomerate of Lonedo (Vicenza) containing about 2.5% of ZrO₂ are finely pulverized and introduced into a rotary cylinder lined with siliceous material and submitted to a slight heating with 5.2 kgs. of precipitated magnesium fluoride such as is freshly extracted in a subsequent phase of the operation which will be described hereinafter, and with 50 kgs. of a salt-acid solution of potassium chloride and of HCl having a content of 15 to 16% of potassium chloride and 6% of hydrochloric acid respectively. This pasty mixture is left for reaction during some hours while promoting the reaction by a fresh slow mixing and a moderate heating up to 65–85° C., after which the mixture is introduced into a very powerful press which expels all the liquid from it, and then the residue of this operation is lixiviated with small quantities of water and the briquettes which are thus obtained are introduced into a burning furnace. The expelled liquid, which is composed of a solution of magnesium chloride and of potassium chloride is collected in a large vessel. In the burning furnace the briquettes are heated up to a temperature of about 600° C. during a time which varies between 1 hour and 1 hour and a half or two hours, and after cooling and crushing the product is washed and then the filtered liquid is collected, while the residual mineral gangue is washed and released from the salts which it still contains in a liquid suspension, and then discarded.

The liquid of the lixiviation is then introduced into the cathodic compartment of an electrolyzer for potassium chloride of the mercury type, in which zirconium hydrate precipitates. The reaction which is produced between the solution and the potassium cation is as follows:

$$2KFZrF_4 + 4K + 4H_2O = 6KF + Zr(OH)_4 + 2H_2$$

The obtained precipitate is then recovered in a filter-press, while the liquid, which is formed of a mixture of fluorinated and chlorinated potassium salts, is mixed in the large vessel in which the solution of magnesium and potassium salts which has been expelled from the paste has been formerly collected. The magnesium fluoride is then re-formed in this vessel by precipitation and separated by decantation and then conveyed to the first phase of the operation. The reaction which takes place between both solutions is as follows:

$$KCl.MgCl_2 + 2KF = 3KCl + MgF_2$$

The liquid which has been decanted and separated from the magnesium fluoride is concentrated until it contains from 30 to 32% of potassium chloride; half of this concentrated solution is introduced into the reaction chamber of the mercury electrolyzer for a fresh operation, while the chlorine which has been converted into hydrochloric acid in an apparatus of the Deacon type is introduced with the other half of the above mentioned concentrated solution into the pressure mixer C, in order to re-form the salt-acid solution of the first treatment. The conversion in the apparatus of Deacon is the known conversion:

$$2Cl_2 + 2H_2O = 4HCl + O_2$$

If the precipitation, according to the reaction which has been cited in the first place, is performed by caustic potash which has been previously obtained in the electrolyzer, the above mentioned conversion can be replaced by a direct synthesis starting from the hydrogen and the chlorine which are developed on the anode and on the cathode, whereby the hydrochloric acid which is necessary can be obtained. There is thus neither a consumption of fluoride nor a consumption of salts nor of acid, with the exception of the losses in the apparatus; the cycle of operations is entirely closed, simple and economical, and the zirconium hydrate which is produced contains about 3.1 to 3.2 kg. of ZrO₂.H₂O.

Example 2

A ton of so-called "mean" berylliferous pegmatite of Valmasul (Bolzano) containing 7.5% of beryllium oxide is treated as in the preceding example but with a quantity of 470 kgs. of precipitated calcium fluoride such as is freshly collected in a subsequent phase of the operation which will be described hereinafter, and 1500–1600 kgs. of a salt-acid solution containing about 45–46% of sodium nitrate and 24–25% of nitric acid such as the solution obtained in a subsequent phase of the operation as hereinafter described. As in the preceding example, the paste is burnt, after having been well compressed in order to extract from the same all the calcium and sodium salts which it contains, at a temperature of about 650° C. during about two hours and then submitted to the lixiviation.

The precipitation of the beryllium hydrate is obtained by means of the sodium ion extracted from an electrolyzer of the mercury type which decomposes the sodium chloride. As in the preceding example the beryllium hydrate which has been precipitated in the electrolyzer is separated in a filter press and the mixed solution of nitrated and fluorinated sodium salts from the electrolyzer is mixed with the liquid which has been expelled in the first place from the briquettes and which contains calcium salts. In the vessel which contains the mixture calcium fluoride is formed again, by precipitation, and, after having been separated by decantation, this calcium fluoride is conveyed to the first phase of the operation.

The liquid which separates from the calcium fluoride by decantation is composed of a solution of sodium nitrate alone, which is conveyed to a vacuum concentration apparatus until a concentration of about 50% of salt is obtained.

This concentrated solution of sodium nitrate is treated with hydrochloric acid to form a solution containing sodium nitrate, sodium chloride and nitric acid in accordance with the following equation:

$$2NaNO_3 + HCl = NaNO_3 + NaCl + HNO_3$$

The sodium chloride is separated from the solution by maintaining the solution at a temperature of about 70° C. The separation of the sodium chloride is caused by the diminution of its solubility in the presence of NO₃ ions. The sodium chloride separated from this solution is utilized in the electrolyzer I for causing precipitation of beryllium hydrate. The chlorine given off in the electrolyzer is converted into hydrochloric acid in an apparatus of the Deacon type according to the reaction $2H_2O + 2Cl_2 = 4HCl + O_2$. This hydrochloric acid is then used to treat another portion of the concentrated sodium nitrate solution produced in the concentrator N. The calcium fluoride which has been precipitated in the vessel M is returned to the pressure mixer C for treating further quantities of ore. The nitric acid and the sodium nitrate separated from the sodium chloride produced by the reaction of hydrochloric acid on the concentrated sodium nitrate solution are also returned to the pressure mixer C for treating further quantities of ore.

Thus the cycle of the operations is entirely closed, very simple and economical; through this operation about 72 to 73 kgs. of pure beryllium oxide will be obtained from the quantity of ore which has been used.

What I claim is:

1. In a cyclic process for the extraction of bases of rare elements of the group consisting of thorium, tantalum, caesium, niobium, zirconium, germanium, scandium, beryllium and lithium, contained in relatively small proportions in silicated minerals, the steps consisting of crushing the mineral, mixing it in a paste with a metal fluoride not easily soluble in water, and an aqueous solution containing a strong acid and a water soluble alkali-metal salt of said strong acid, heating said paste at a low temperature to form a water soluble salt of the metal of the said fluoride, expelling from the paste the liquid containing the said water soluble salt, briquetting the paste and heating it to a high temperature to form water soluble fluorine compound of the rare element to be extracted, lixiviating the reaction product, separating therefrom a solution containing the fluorine compound of the rare element and at least a part of the initial alkali-metal salt, electrolyzing said solution to precipitate the rare element in the form of an insoluble hydroxide, separating said precipitate, regenerating from the residual liquid and from the liquid expelled from the first named paste the not easily water-soluble metal fluoride, the strong acid and the water soluble alkali-metal salt of said strong acid, and returning them into the cycle.

2. In a cyclic process for the extraction of bases of rare elements of the group consisting of thorium, tantalum, caesium, niobium, zirconium, germanium, scandium, beryllium and lithium, contained in relatively small proportions in silicated minerals, the steps consisting of crushing the mineral, mixing it in a paste with a metal fluoride not easily soluble in water and of the group consisting of lithium, magnesium, aluminium, calcium, copper, strontium and lead fluorides, and an aqueous solution containing a strong acid and a water soluble alkali-metal salt of said strong acid, heating said paste at a low temperature to form a water soluble salt of the metal of the said fluoride, expelling from the paste the liquid containing the said water soluble salt, briquetting the paste and heating it to a high temperature to form water soluble fluorine compound of the rare element to be extracted, lixiviating the reaction product, separating therefrom a solution containing the fluorine compound of the rare element and at least a part of the initial alkali-metal salt, electrolyzing said solution to precipitate the rare element in the form of an insoluble hydroxide, regenerating from the residual liquid and from the liquid expelled from the first named paste the not easily water soluble metal fluoride, the strong acid and the water soluble alkali-metal salt of said strong acid, and returning them into the cycle.

3. In a cyclic process for the extraction of bases of rare elements of the group consisting of thorium, tantalum, caesium, niobium, zirconium, germanium, scandium, beryllium and lithium, contained in relatively small proportions in silicated minerals, the steps consisting of crushing the mineral, mixing it in a paste with a metal fluoride not easily soluble in water, and an aqueous solution containing hydrochloric acid and a water soluble alkali-metal chloride, heating said paste at a low temperature to form a water soluble salt of the metal of the said fluoride, expelling from the paste the liquid containing the said water soluble salt, briquetting the paste and heating it to a high temperature to form water soluble fluorine compound of the rare element to be extracted, lixiviating the reaction product, separating therefrom a solution containing the fluorine compound of the rare element and at least a part of the initial alkali-metal chloride, electrolyzing said solution to precipitate the rare element in the form of an insoluble hydroxide, separating said precipitate, regenerating from the residual liquid and from the liquid expelled from the first named paste the not easily water soluble metal fluoride, the hydrochloric acid and the water soluble alkali-metal chloride, and returning them into the cycle.

4. In a cyclic process for the extraction of bases of rare elements of the group consisting of thorium, tantalum, caesium, niobium, zirconium, germanium, scandium, beryllium and lithium, contained in relatively small proportions in silicated minerals, the steps consisting of crushing the mineral, mixing it in a paste with a metal fluoride not easily soluble in water, and an aqueous solution containing sulphuric acid and a water soluble alkali-metal sulphate, heating said paste at a low temperature to form a water soluble salt of the metal of the said fluoride, expelling from the paste the liquid containing the said water soluble salt, briquetting the paste and heating it to a high temperature to form water soluble fluorine compound of the rare element to be extracted, lixiviating the reaction product, separating therefrom a solution containing the fluorine compound of the rare element and at least a part of the initial alkali-metal sulphate, electrolyzing said solution to precipitate the rare element in the form of an insoluble hydroxide, separating said precipitate, regenerating from the residual liquid and from the liquid expelled from the first named paste the not easily water soluble metal fluoride, the sulphuric acid and the water soluble alkali-metal sulphate, and returning them into the cycle.

5. In a cyclic process for the extraction of bases of rare elements of the group consisting of thorium, tantalum, caesium, niobium, zirconium, germanium, scandium, beryllium and lithium, contained in relatively small proportions in silicated minerals, the steps consisting of crushing the mineral, mixing it in a paste with a metal fluoride not easily soluble in water, and an aqueous solution containing nitric acid and an excess of a water soluble alkali-metal nitrate, heating said paste at a low temperature to form a water soluble salt of the metal of the said fluoride, expelling from the paste the liquid containing the said water soluble salt, briquetting the paste and heating it to a high temperature to form water soluble fluorine compound of the rare element to be extracted, lixiviating the reaction product, separating therefrom a solution containing the fluorine compound of the rare element and at least a part of the initial alkali-metal nitrate, electrolyzing said solution to precipitate the rare element in the form of an insoluble hydroxide, separating said precipitate, regenerating from the residual liquid and from the liquid expelled from the first named paste the not easily water soluble metal fluoride, the nitric acid and the water soluble alkali-metal nitrate, and returning them into the cycle.

6. In a cyclic process for obtaining zirconium hydrate from silicated minerals containing a relatively small proportion of zirconium, the steps consisting of crushing the mineral, mixing it in a paste with magnesium fluoride and an aqueous solution containing hydrochloric acid and a water soluble alkali-metal chloride, heating said paste at a low temperature to form magnesium chloride, expelling from the paste the liquid containing the magnesium chloride and alkali-metal chloride, briquetting the paste and heating it to a high temperature to form a water soluble fluorine compound of zirconium, lixiviating the reaction product, separating therefrom a solution containing the fluorine compound of zirconium and at least a part of the initial alkali-metal chloride, electrolyzing said solution to precipitate zirconium hydrate, separating said precipitate, mixing the solution from the electrolyzer and which contains fluorinated and chlorinated alkali-metal salts with the solution containing magnesium chloride and alkali-metal chloride expelled from said paste to precipitate magnesium fluoride and form a solution of alkali-metal chloride, using a portion of said alkali-metal chloride solution in the electrolyzer for a fresh operation of precipitating zirconium hydroxide, converting the chlorine from the electrolyzer into hydrochloric acid, and returning to the cycle the precipitated magnesium fluoride, the hydrochloric acid and the alkali-metal chloride solution not used in the electrolyzer.

7. In a cyclic process for obtaining beryllium hydrate from silicated minerals containing a relatively small proportion of beryllium, the steps consisting of crushing the mineral, mixing it in a paste with calcium fluoride and an aqueous solution containing nitric acid and a water soluble alkali-metal nitrate, heating said paste at a low temperature to form calcium nitrate, expelling from the paste the liquid containing the calcium nitrate and alkali-metal nitrate, briquetting the paste and heating it to a high temperature to form a water soluble fluorine compound of beryllium, lixiviating the reaction product, separating therefrom a solution containing the fluorine compound of beryllium and at least a part of the initial alkali-metal nitrate, electrolyzing said solution to precipitate beryllium hydrate, separating said precipitate, mixing the solution from the electrolyzer and which contains fluorinated and nitrated alkali-metal salts with the solution containing calcium nitrate and alkali-metal nitrate expelled from said paste to precipitate calcium fluoride and form a solution of alkali-metal nitrate, reacting a portion of said solution of alkali-metal nitrate with hydrochloric acid to form a solution containing alkali-metal chloride, alkali-metal nitrate and nitric acid, separating the alkali-metal chloride from said last mentioned solution and utilizing it in the electrolyzer for a fresh operation of precipitating beryllium hydrate, converting the chlorine given off in the electrolyzer into hydrochloric acid and using the hydrochloric acid to treat another portion of alkali-metal nitrate solution, and returning to the cycle the precipitated calcium fluoride, the nitric acid and also the alkali-metal nitrate not reacted with hydrochloric acid.

CARLO ADAMOLI.